United States Patent [19]

Obermeier et al.

[11] Patent Number: 5,069,584

[45] Date of Patent: Dec. 3, 1991

[54] HOLLOW DRILLING TOOL

[75] Inventors: Josef Obermeier, Munich, Fed. Rep. of Germany; Eugen Magyari, Gams, Switzerland; Walter Ritt, Schnifis, Austria; Ernst Wohlwend, Nendeln; Horst-Detlef Gassmann, Ruggell, both of Liechtenstein; Peter Cavada, Feldkirch, Austria

[73] Assignee: Hilti Aktiengesellschaft, Fürstentum, Liechtenstein

[21] Appl. No.: 468,375

[22] Filed: Jan. 22, 1990

[30] Foreign Application Priority Data

Jan. 20, 1989 [DE] Fed. Rep. of Germany ....... 3901528

[51] Int. Cl.[5] .............................................. B23B 27/20

[52] U.S. Cl. .................................... 408/145; 408/144; 408/204; 408/207; 125/20; 175/403; 175/409; 175/408

[58] Field of Search ............... 408/144, 145, 207, 204, 408/703; 125/20; 175/330, 403, 408, 409, 325, 396

[56] References Cited

U.S. PATENT DOCUMENTS

| | | | |
|---|---|---|---|
| 3,120,286 | 2/1964 | Bridwell | 175/408 |
| 3,762,828 | 10/1973 | Faber | 175/408 X |
| 3,833,077 | 9/1974 | Lavelle | 175/325 |
| 4,208,154 | 6/1980 | Gundy | 408/145 X |

FOREIGN PATENT DOCUMENTS

| | | | |
|---|---|---|---|
| 437621 | 6/1972 | U.S.S.R. | 408/144 |
| 745701 | 7/1980 | U.S.S.R. | 125/20 |
| 791890 | 12/1980 | U.S.S.R. | 175/403 |
| 856821 | 8/1981 | U.S.S.R. | 408/145 |
| 2052325 | 1/1981 | United Kingdom | 408/703 |

OTHER PUBLICATIONS

Longyear Advertisement, 1957.

*Primary Examiner*—Larry I. Schwartz
*Assistant Examiner*—Robert Schultz
*Attorney, Agent, or Firm*—Toren, McGeady & Associates

[57] ABSTRACT

A hollow drilling tool is made up of an axially extending tubular carrier part, a cutting body at one end of the carrier part, and guide elements located in the axial direction of the carrier part between the cutting body and the carrier part. The radially outer surface of each guide element is in alignment in the axial direction of the carrier part with the radially outer surface of the cutting body. The guide elements guide the hollow drilling tool in a borehole formed by the cutting body.

5 Claims, 2 Drawing Sheets

HOLLOW DRILLING TOOL

BACKGROUND OF THE INVENTION

The present invention is directed to a hollow drilling tool formed of a tubular carrier part with cutting bodies arranged at its front or leading end.

Hollow drilling tools are used chiefly for drilling boreholes of larger diameter. Such a hollow drilling tool is disclosed in GB-PS 935,030. In this hollow drilling tool, the annular cutting body is connected with the carrier part. The radial guidance of this hollow drilling tool is afforded exclusively by the cutting body. With time, the cutting body becomes worn and, as a result, its guidance length becomes shortened. If the guidance length is too small, an accurate borehole geometry is not insured.

SUMMARY OF THE INVENTION

Therefore, the primary object of the present invention is to provide a hollow drilling tool affording complete utilization of the cutting bodies, and, at the same time, making it possible to maintain accurate borehole geometry.

In accordance with the present invention, accurate guidance is achieved with guide elements arranged adjoining the cutting bodies and between the cutting bodies and the carrier part, in other words, the cutting bodies lead in the drilling direction followed by the guide elements. The radially outer surface of the guide elements is aligned in the drilling direction with the radially outer surface of the cutting bodies for at least a portion of the circumference of the guide elements. The guide elements have a higher resistance to wear compared with the carrier part and the axial extent of the guide elements corresponds at least to the axial extent of the cutting bodies.

As a result of the arrangement of the guide elements, the two functions of "cutting" and "guiding" are separated from one another. Since the radially outer surface of the guide elements corresponds to the radially outer surface of the cutting bodies for at least a part of the circumference of the guide elements, the guide elements provide guidance in the borehole previously drilled by the cutting bodies. A sufficient guidance of the hollow drilling tool in the borehole is assured throughout the entire service life of the cutting bodies when the axial extent of the guide elements corresponds at least to the axial extent of the cutting bodies.

Preferably, the guide elements are formed as segments. Such segments extend along a portion of the circumference of the tool. If the circumferential extent of the segments is sufficiently small and the outer diameter of the hollow drilling tool is sufficiently large, the segments can be constructed as plane strips extending in the axial direction.

In a preferred arrangement, at least three segments are arranged in spaced relation around the circumference. The centrally guided position of the hollow drilling tool in a borehole is determined by the three segments. It is also possible to use more than three segments, for example, four or six, for providing a favorable distribution of lateral forces.

Preferably, the segments are elongated and follow the cutting bodies opposite to the drilling direction. As a result, the cutting bodies are supported in the axial direction by the segments, that is, the axial direction of the drilling tool, and, in turn, the guide elements are supported by the carrier part. The guide element segments and the cutting bodies can be produced individually and, subsequently, connected together such as by soldering. Since the cutting bodies preferably contain synthetic diamonds embedded in a metal matrix, the cutting bodies and the segments can also be presintered individually and, subsequently, sintered together to form a single body.

Advantageously, the segments are arranged in corresponding recesses in the carrier body. In such an arrangement, the segments are enclosed on three sides by the carrier part. Under severe operating conditions, the segments are prevented from breaking out of or separating from the tool due to a positive locking connection of the segments with the carrier part.

In a preferred arrangement, the segments are part of a guide unit or annular carrier located between the carrier part and the cutting bodies. The annular carrier can be produced separately and, subsequently, connected with the carrier part at one end and with the cutting bodies at the opposite end. Such an arrangement of the tool enables efficient and economical production. The annular carrier can be formed with grooves extending in the axial direction so that segments or strips are located between the individual grooves with the strips serving to guide the hollow drilling tool. Further, the grooves serve for an effective drainage of coolant water and drillings rinsed away by such water. Such an annular carrier can be presintered and subsequently connected with the cutting bodies.

Preferably, the guide elements are formed of a wear-resistant hard material. Silicon carbide or the like is such a hard material. These hard materials can be sintered into a matrix material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
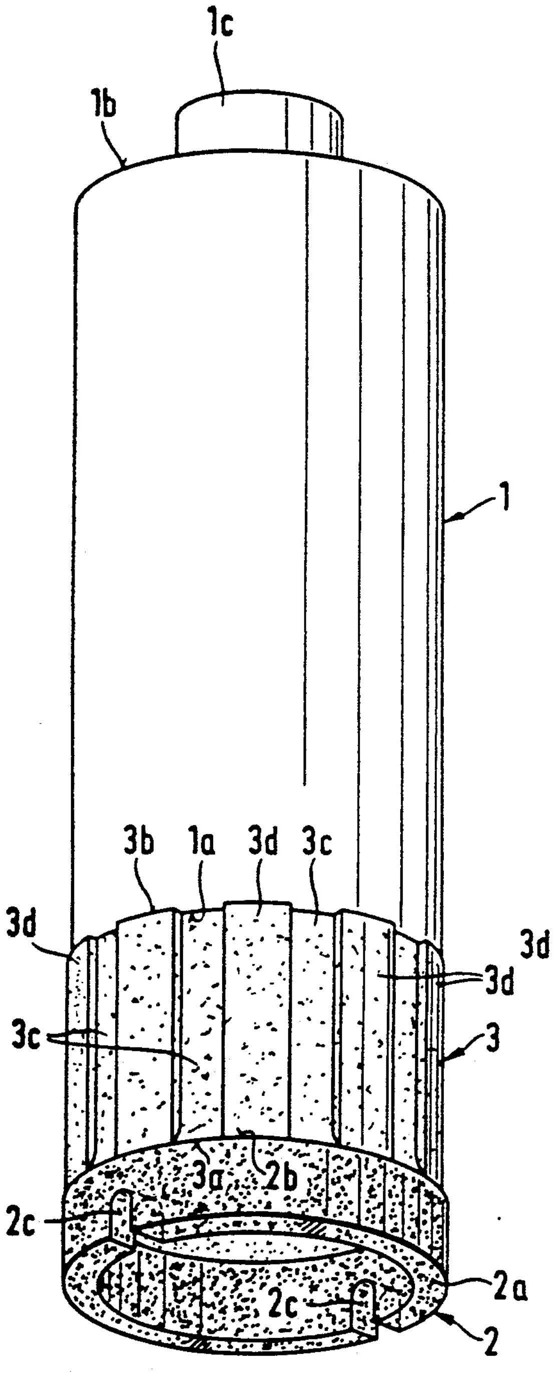
FIG. 1 is a perspective view of a hollow drilling tool embodying the present invention.
Figure 2:
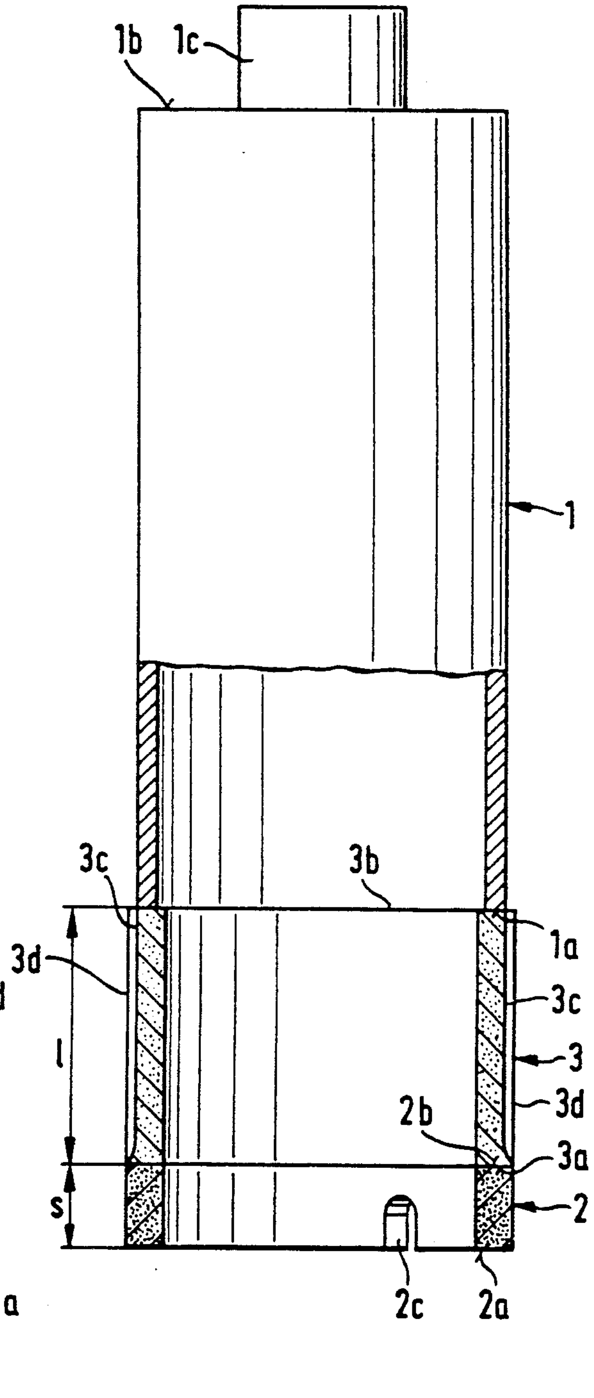
FIG. 2 is an elevational view, partly in section, of the hollow drilling tool displayed in FIG. 1.

In FIGS. 1 and 2, a hollow drilling tool is illustrated, having a leading end at the lower end and a trailing end at the upper end. Extending from the trailing end toward the leading end is a tubular carrier part 1 with a cutting body 2 located at the leading end and extending toward the trailing end with an annular carrier part 3 located between them. The carrier part 1, has a leading end la and a trailing end 1*b* forming the trailing end of the tool. Carrier part 1 has a connection fitting 1*c* at its trailing end 1*b*. Cutting body 2 has a leading end 2*a* at the leading end of the tool and a trailing end 2*b*. Further, the cutting body 2 has two slots 2*c* extending from its leading end 2*a* toward its trailing end with the slots arranged diametrically opposite one another and terminating intermediate the ends of the cutting body. Slots 2*c* serve for the passage of coolant water, fed through the carrier part 1, from the inside to the outside of the hollow drilling tool. The carrier 3 has a leading end 3*a* and a trailing end 3*b*. The leading end 3*a* of the carrier is connected with the trailing end 2*b* of the cutting body. Carrier 3 has grooves 3*c* in its radially outer surface extending in the axial direction and also around a portion of its circumference. These grooves 3*c* serve for the drainage of coolant water and of the drillings or drilled material rinsed away by the water. The grooves 3*c* are separated by webs which serve for guidance of the tool and are constructed as segments 3*d*. At its trailing end 3*b*, the carrier 3 is connected with the leading end 1*a* of the carrier part. The connection of the carrier part 1 with the carrier 3 can be effected by means of welding or soldering. In addition, the connection between the cutting body 2 and the carrier 3 can also be effected by welding or soldering. Moreover, it is possible to sinter together the cutting body 2 and the carrier 3. The axial extent of the carrier 3 amounts to a multiple of the axial extent s of the cutting body 2.

Figure 3:
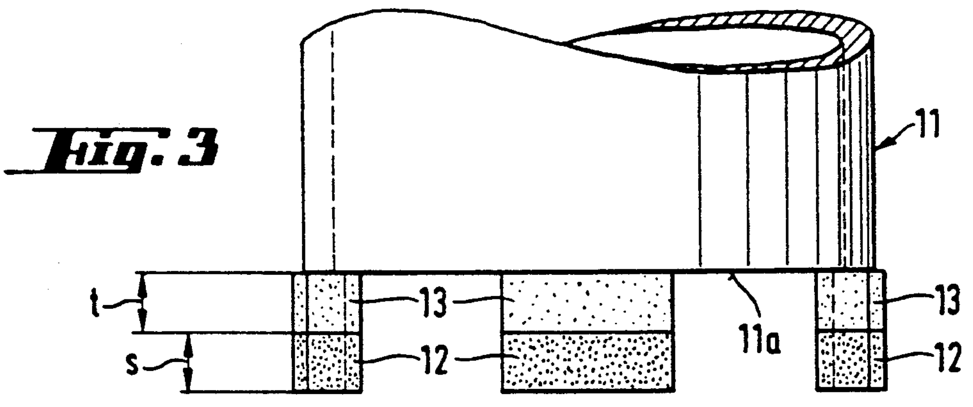
FIG. 3 is an elevational view of a leading end portion of another hollow drilling tool embodying the present invention.

In FIG. 3, an axially extending leading end portion of a drilling tool is displayed made up of a carrier part 11 with cutting bodies 12 located at the leading end 11*a* of the carrier part and guidance segments 13 are located between the carrier part and the cutting bodies. The segments 13 located between the leading end of the carrier part 11 and the trailing end of the cutting bodies 12 correspond in cross-section to the cutting bodies 12. Cutting bodies 12 and segments 13 can be joined together by sintering, soldering or welding. The segments 13 are connected to the carrier part 11 by welding or soldering. The carrier part 11 and the segments 13 are connected together only at the leading end 11*a* or the carrier part. Coolant water can circulate from inside to outside of the tubular carrier part 11 through the gaps formed between adjacent segments 13 and cutting bodies 12. The axial extent of the segments 13 corresponds approximately to the axial extent s of the cutting bodies 12. Accordingly, it is assured that adequate guidance is afforded until the cutting bodies 12 are completely worn.

Figure 4:
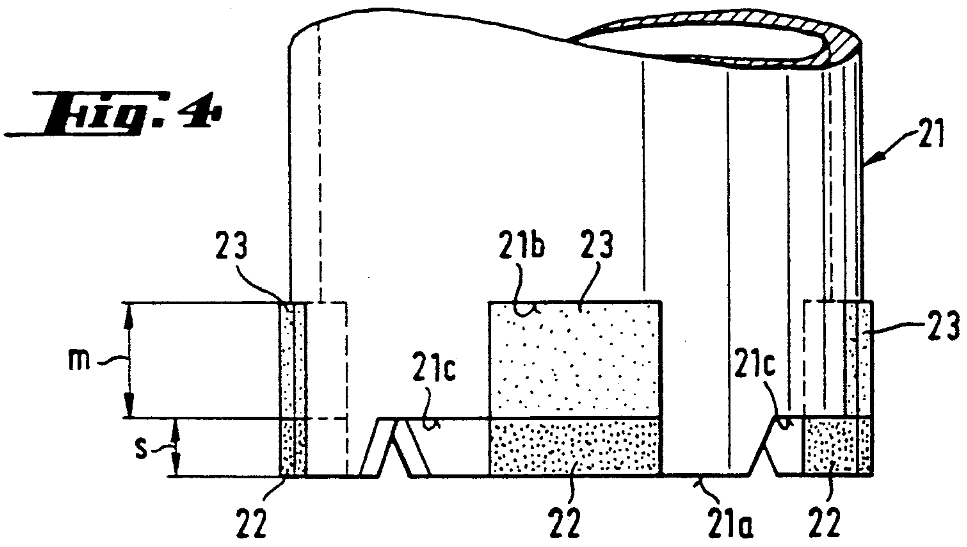
FIG. 4 is a view similar to FIG. 3 of still another embodiment of a hollow drilling tool in accordance with the present invention.

Another hollow drilling tool is shown in FIG. 4, made up of a carrier part 21, with cutting bodies 22 and segments 23 arranged in the leading end 21*a* of the carrier part. The cutting bodies 22 and guidance segments 23 are arranged in recesses 21*b* formed in the leading end 21*a* of the carrier part 21. The axial extent m of the segments 23 is approximately twice the axial extent s of the cutting bodies 22. Accordingly, effective guidance of the hollow drilling tool is assured, even when the cutting bodies 22 are virtually completely worn. Segments 23 are completely embedded in the carrier part 21 with three sides of the segments contacting the surfaces of the recesses 21*b* formed in the carrier part. The cutting bodies 22 are connected with the segments 23. Carrier part 21 has openings 21*c* at its leading end 21*a* located between adjacent cutting bodies 22. Openings 21*c* serve for the passage of the coolant water from the inside to the outside of the carrier part 21.

Figure 5:
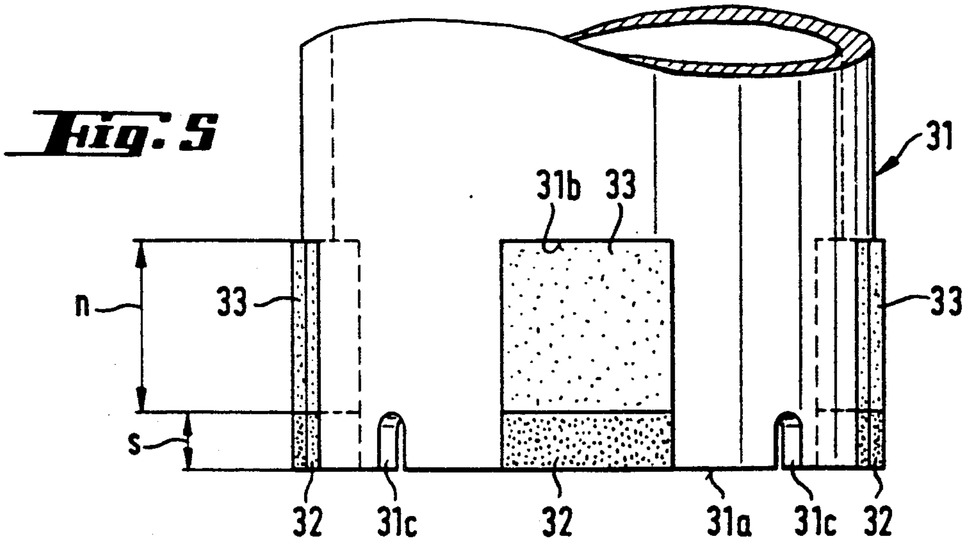
FIG. 5 is a elevational view of a leading end portion of a further hollow drilling tool embodying the present invention.

Another embodiment of the hollow drilling tool incorporating the present invention is set forth in FIG. 5 formed by a carrier part 31 with cutting bodies 32 arranged at its leading end 31*a* followed by guidance segments 33. The guidance segments 33 and the cutting bodies 32 are completely seated in recesses 31*b* extending axially rearwardly from the leading end 31*a* of the carrier part 31. The axial extent n of the segments 33 is approximately three times the axial extent s of the cutting bodies 32. This arrangement affords a particularly long guidance length and, accordingly, enables the production of very accurate boreholes. At its leading end 31*a*, the carrier part 31 is provided with slots 31*c* located between the cutting bodies 32. These slots, similar to the ones shown in FIGS. 1 and 2, serve for the flow of the coolant water from the inside of the hollow drilling tool. The cutting bodies 32 and the segments 33 can be joined together by welding, soldering or sintering. The connection of the segments 33 to the carrier part 31 is achieved by soldering or welding.

While specific embodiments of the invention have been shown and described in detail to illustrate the application of the inventive principles, it will be understood that the invention may be embodied otherwise without departing from such principles.

We claim:

1. Hollow drilling tool comprising an axially extending tubular carrier part (1, 11, 21, 31) with a circumferentially extending radially outer surface having a first end (1*a*, 11*a*, 21*a*, 31*a*) and a second end, at least one cutting body (2, 12, 22, 32), said at least one cutting body having a first end and a second end spaced apart in the axial direction, and a radially outer surface and a radially inner surface, wherein the improvement comprises said at least one cutting body is formed of a material different from that of said carrier part, said radially outer surface of said at least one cutting body has a greater diameter than the radially outer surface of said carrier part so that said at least one cutting body projects radially outwardly beyond said carrier part, guide elements extending in the axial and circumferential direction of said carrier part and extending in the axial direction from contact with said at least one cutting body to contact with said carrier part, said guide elements having a radially outer surface aligned in the axial direction of said carrier part with the radially outer surface of said at least one cutting body for at least a part of the circumferential extent thereof so that the radially outer surface of said guide elements projects radially outwardly from said carrier part, said guide elements having a greater resistance to wear than said carrier part, and said guide elements having an axial extent (1, m, n, t) corresponding at least to the axial extent (s) of said at least one cutting body (2, 12, 22, 32), said guide elements are formed as segments disposed in spaced relation in the circumferential direction with at least three said segments (3*d*, 13, 23, 33) disposed in spaced relation around the circumference, adjacent said segments defining axial extending sides of grooves extending axially from the at least one cutting body and extending radially inwardly from the radially outer surface of said guide element, said guide elements are formed of a material different from said carrier part and said at least one cutting body, and said segments each have a first end and a second end with the segment first end contacting the second ends of one of the at least one cutting body and the segment second ends contacting the carrier part, and said grooves being coextensive with said segments.

2. Hollow drilling tool, as set forth in claim 1, wherein said segments (23, 33) are located in recesses (21*b*, 31*b*) formed in the first end of said carrier part (21, 31).

3. Hollow drilling tool, as set forth in claim 1, wherein said segments are part of an annular carrier (3) located between the first end of said carrier part (1) and said at least one cutting body (2).

4. Hollow drilling tool, as set forth in claim 1, wherein said guide elements are formed of a wear-resistant hard material having a hardness at least equal to the hardness of silicon carbide.

5. Hollow drilling tool, as set forth in claim 1, wherein a plurality of said cutting bodies are mounted at the first end of said carrier part and said cutting bodies have a uniform radial dimension for the axial length between the first and second ends thereof.

* * * * *